(12) United States Patent
Newman

(10) Patent No.: US 6,604,317 B1
(45) Date of Patent: *Aug. 12, 2003

(54) FLY TRAP

(76) Inventor: Neil A. Newman, 4552 Poygan Ave., Omro, WI (US) 54963

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/263,531

(22) Filed: Mar. 5, 1999

(51) Int. Cl.[7] ............................................. A01M 1/02
(52) U.S. Cl. ..................................... 43/122; 43/107
(58) Field of Search ................................ 43/107, 122

(56) References Cited

U.S. PATENT DOCUMENTS

| 1,924,379 A | * | 8/1933 | Reese | 43/122 |
| 2,014,500 A | * | 9/1935 | Lass | 43/122 |
| 4,141,174 A | * | 2/1979 | Smith | 43/139 |
| 4,557,069 A | * | 12/1985 | Caldwell | 43/107 |
| 5,243,781 A | * | 9/1993 | Carter | 43/122 |
| 5,363,589 A | * | 11/1994 | Flynn | 43/122 |
| 5,392,560 A | * | 2/1995 | Donahue et al. | 43/122 |
| 5,522,171 A | * | 6/1996 | Mandeville | 43/122 |
| 5,842,305 A | * | 12/1998 | Liao | 43/122 |

FOREIGN PATENT DOCUMENTS

| DE | 70830 | * 11/1892 | 43/122 |

* cited by examiner

Primary Examiner—Kurt Rowan

(57) ABSTRACT

A blood-feeding-fly trap composed of 3 or more legs held in position by a top element or elements and a flexible cover. Spacing rods also locate the legs and hold the cover taut. A dark object hangs freely from the top element to attract the flies which are retained in a container at the top of the trap. The design allows easy relocation when assembled. All major elements are held by fasteners that allow assembly and disassembly for efficient manufacture, shipping, and storage.

4 Claims, 3 Drawing Sheets

FLY TRAP

CROSS-REFERENCE TO RELATED APPLICATIONS

References Cited

U.S. PATENT DOCUMENTS

U.S. Pat. No. 5,836,104 Epps
U.S. Pat. No. 5,419,076 Moreland et.al.
U.S. Pat. No. 5,374,748 Moreland et.al.
U.S. Pat. No. 5,243,781 Carter
U.S. Pat. No. 5,363,589 Flynn
U.S. Pat. No. 4,738,049 Baley

STATEMENT REGARDING FEDERALLY SPONSORED RESEARCH OR DEVELOPMENT

Not applicable

REFERENCE TO A MICROFICHE APPENDIX

Not Applicable

BACKGROUND OF THE INVENTION

It has been reported that the commercial loss due to horse, cattle, and other livestock pests is in excess of $700 million dollars per year in the United States.

This invention pertains to a trap to catch blood-feeding types of flies, particularly horse flies (insect family Tabanidae), one of the major livestock pests. Specifically, this invention is a chemical-free means of controlling blood-feeding fly populations around horses, cattle, and other large animals. The various fly trapping devices that have heretofore been proposed to catch flies with chemical baits do not attract the blood-feeding flies that are detrimental to these large animals. Those traps proposed for the blood-feeding type of fly are of a large and costly size such that the animals move through the trap structure or of such construction so as not to be easily relocated or suitable for efficient commercial production.

The present invention provides an entirely new approach to the construction of a portable blood-feeding fly trap suitable for manufacture, shipping, and storage.

U.S. Pat. Nos. 5,419,076 and 5,374,748 (Moreland et.al.) Is typical of the traps proposed that trap the blood-feeding flies that cause this loss. This type of trap requires the host animal to move through the trap where the flies abandon the animal and are caught in the trap. This entails a large structure that the animal is able and willing to move through.

U.S. Pat. No. 5,836,104 (Epps) is complex to assemble, can not be relocated without disassembly, and does not take advantage of the fly's attraction to a moving object.

Some traps have been developed to take advantage of the blood-feeding flies attraction to dark moving objects and cover the object with a sticky material from which the flies have to be removed and the sticky material reapplied. Still other traps depend upon the behavior of flies to fly upwards when they find that the object is not a potential meal. These traps have been made of wood and other materials fastened together in a permanent manner so as to be unsuitable for efficient manufacturing and bulky to ship or store.

Many fly traps, for example, U.S. Pat. No. 5,243,781 (Carter), U.S. Pat. No. 5363589 (Flynn), U.S. Pat. No. 4,738,049 (Baley), and others, involve using a chemical bait, which does not attract the blood-feeding type of flies.

One response to this problem has been chemical insecticide control. The wetland habitat that support the larvae of blood-feeding flies makes the use of insecticides expensive, impractical, and ultimately environmentally undesirable.

BRIEF SUMMARY OF THE INVENTION

A blood-feeding-fly trap constructed in such a way and made of materials that allows the trap to be disassembled for storage, economical shipping, efficient manufacture, and easy to relocate when assembled. The trap is placed in proximity to the livestock and does not require contact with the animals. The trap consists of a multiple of legs, held together by a central element and covered with flexible material. A deflatible or collapsible fly lure is suspended from the top element in such a way that it is allowed to swing in a breeze. A container is placed on top the central element to retain the trapped flies. All major parts are held together with removable fasteners for assembly and disassembly.

The advantages of this invention over past inventions is that it requires no organic baits or electricity, is easy to assemble, small to store, does not require livestock contact, and is easy to relocate when assembled.

DETAILED DESCRIPTION OF THE INVENTION

Figure 1:
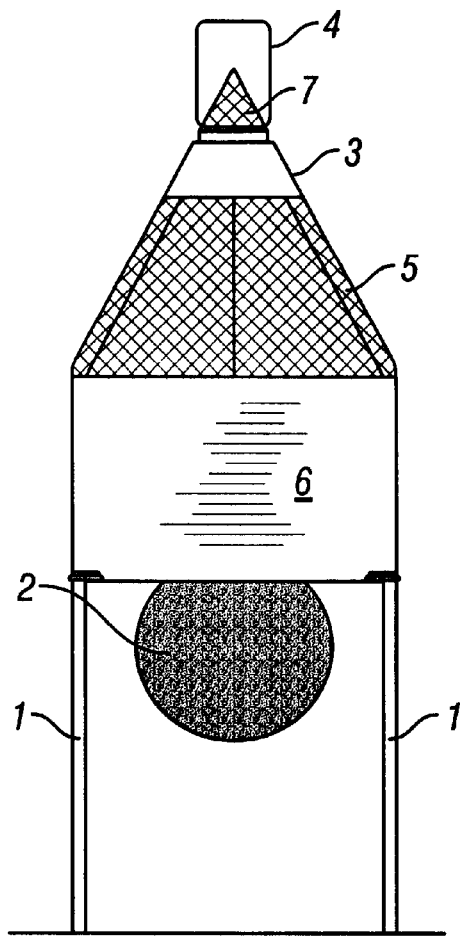
FIG. 1 is a side elevation view of the trap.

With reference to FIG. 1, a generic embodiment of the invention is illustrated. As shown legs 1, joined by central elements 3, form a frame and are enclosed by a tent-like element with an opening at the peak consisting of mesh 5 and fabric 6. A clear container 4 with an internal mesh cone 7 sits atop the central elements. An inflatable target ball 2 forms a swinging element and hangs from the central elements, a portion of which falls below the tent covering.

Figure 2:
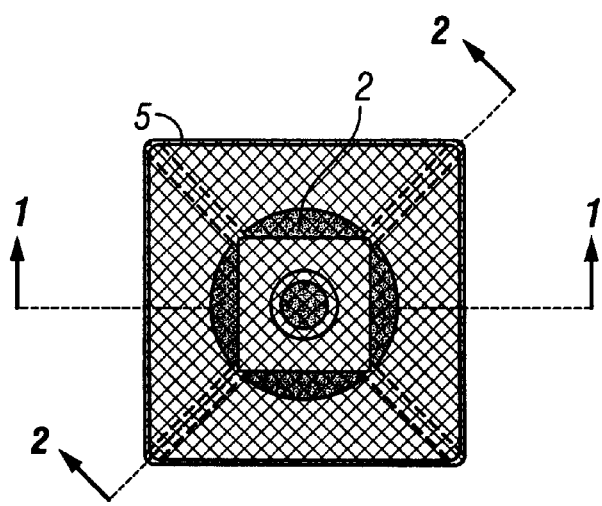
FIG. 2 is a is top plan view of the trap.

With reference to FIG. 2, illustrates a plan view looking down on the trap. The legs 1 can be seen through the mesh cover 5 as they are joined at the top by central elements 3. The inflatable ball 2 can be seen through the mesh 5, the container 4 which is clear, and the mesh cone 7 which is in the container 4.

Figure 3:
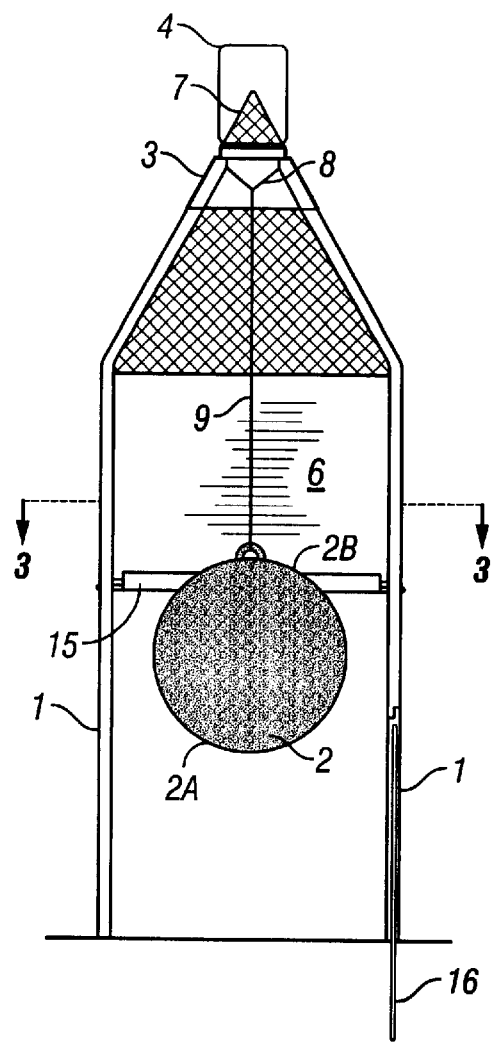
FIG. 3. is a cross section view of the trap taken generally along lines 1—1 of FIG. 2.

FIG. 3 illustrates a cross section of the trap generally about section lines 1—1 of FIG. 2. A hanger 8 and a link or support rod 9 attach the inflatable ball or swinging element 2 to the top section 3 of the trap in such a manner that the ball is allowed to swing freely when blown by a breeze. The lower portion 2A of the swinging element 2 is below the pocket 15 and the upper portion 2B of the swinging element 2 is above the pocket 15. Hanger 8 is retained by the top ends of two opposing legs 1. Link 9 hooks over hanger 8 and into a retaining ring on the inflatable ball 2. One of the legs 1 is shown cut-away to illustrate how it is placed over rod post 16 which is driven in the ground and gives the trap additional stability in windy conditions.

Figure 4:
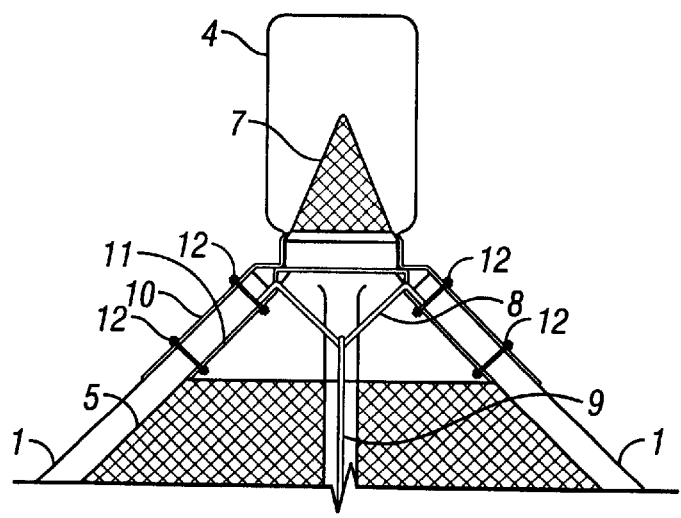
FIG. 4. is an enlarged partial cross section side elevation view taken through the top of section 2—2 of FIG. 2. Showing the relationship of the top of the legs and the top elements

FIG. 4 is similar to the top section of FIG. 3 enlarged, except it is taken along lines 2—2 of FIG. 2. It illustrates that top elements 3 consists of an outer portion 10 and an inner portion 11. The ends of legs 1 and the top of mesh 5 are sandwiched between an outer portion 10 and an inner portion 11 of top elements 3. Screws or bolts 12 hold the sandwich of outer portion 10, inner portion 11, top ends of legs 1, and top of mesh 5 together. This sandwich seals off the opening in the peak of mesh 5. Clear container 4 is held in outer portion 10 by friction or screw threads. Mesh cone 7 has a hole in the top and is retained in the neck of container 4.

Figure 5:
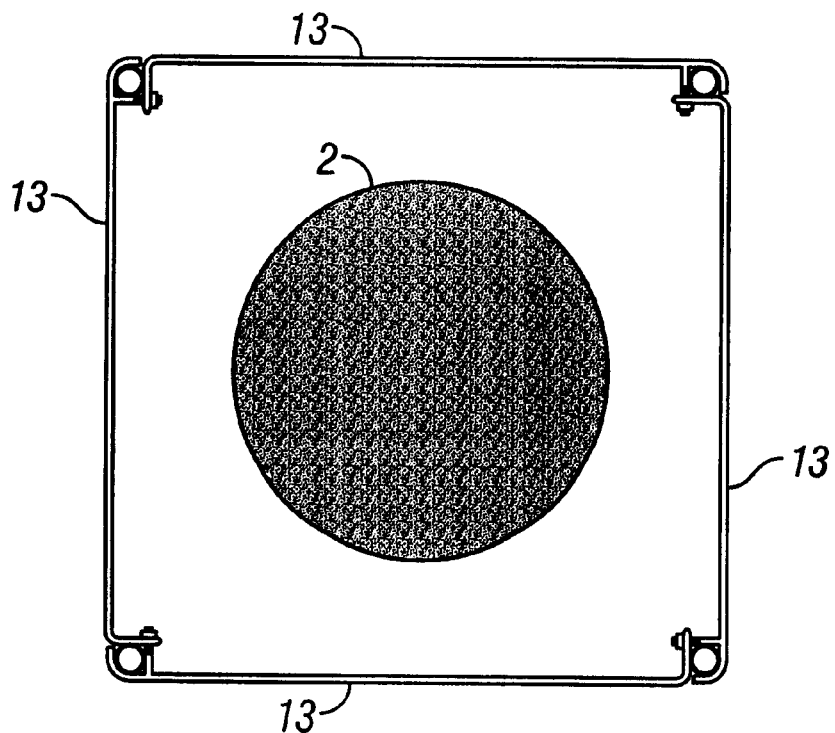
FIG. 5 is a plan view taken through section 3—3 of FIG. 3. Showing the relationship of the brace rods and the legs.

FIG. 5 illustrates a plan view of the trap taken along lines 3–3 of FIG. 3. The inflatable ball 2 is shown hanging in the middle of the trap. Spacer rods 13 are shown holding the legs 1 in proper orientation. The spacer rods 13 are retained in a pocket 15 formed by the the bottom of tent fabric 6 illustrated in FIG. 3. The spacer rods 13 enclosed in the pocket 15 and clamped onto legs 1 are pulled down and hold taut the tent consisting of mesh 5 and fabric 6.

Figure 6:
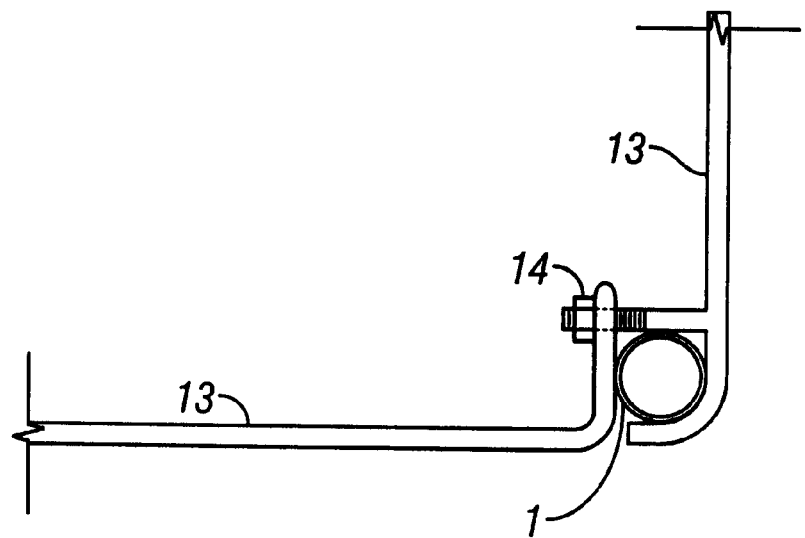
FIG. 6 is an enlarged, sectional view of the corner of FIG. 5 showing how the ends of the brace rods connect and confine the legs.

FIG. 6 is an enlarged view of a corner of FIG. 5 and illustrates the means whereby the ends of spacer rods 13 clamp onto legs 1 with nut 14 tightening both ends of spacer rods 13 about leg 1.

All major elements of the trap before assembly can be stored in a relatively flat carton for storage and shipping. The trap can be assembled with simple tools and can be disassembled for storage.

Once assembled the trap functions by attracting the biting flies to the dark inflated target ball 2 which moves in a breeze. This attraction is the nature of this kind of fly. When the fly discovers the ball 2 is not a potential meal it flies up. Flying up is also the nature of this kind of fly. The fly is confined by the tent consisting of mesh 5 and fabric 6. The fly eventually works its way up into the mesh cone 7 and out through the hole in the top of mesh cone 7 into container 4 where it can not find its way out and dies.

A rod post 16 driven into the ground and the trap placed such that one of the hollow legs 1 is placed over the post helps to stabilize the trap in windy conditions.

What I claim as my invention is:

1. A baitless fly trap relying on a motion element for attracting and capturing insects which are naturally attracted to moving objects, said fly trap comprising:

a. a base having a hole;

b. a plurality of legs, each having an upper portion and a lower portion, wherein said legs are removably connected to the base;

c. a container defining an internal space, wherein said container is removably connected to the hole in the base and is located above the base;

d. a conical screen located within said space with an upper open end and a lower open end, wherein said lower open end is removably connected to the container, and wherein said lower open end is a larger diameter than said upper open end;

e. a cover removably connected to the base and the legs, said cover having an upper end and a lower end, wherein said upper end has a hole located therein, and wherein said cover extends from the base and covers the upper portion of said legs;

f. a swinging element comprising an inflatable target ball and being removably and pivotally suspended from the base for attracting insects without the use of additional bait.

2. The fly trap of claim 1, further comprising a support rod removably connected to the lower portion of one of said legs.

3. The fly trap of claim 1, further comprising a plurality of spacer rods wherein each spacer rod is removably connected to two supporting legs.

4. The fly trap of claim 1, wherein said swinging element further includes an upper portion and a lower portion, wherein said lower portion is located below the lower end of the cover.

* * * * *